US008849666B2

(12) United States Patent
Jaiswal et al.

(10) Patent No.: US 8,849,666 B2
(45) Date of Patent: Sep. 30, 2014

(54) CONFERENCE CALL SERVICE WITH SPEECH PROCESSING FOR HEAVILY ACCENTED SPEAKERS

(75) Inventors: Peeyush Jaiswal, Boca Raton, FL (US); Burt Leo Vialpando, Irving, TX (US); Fang Wang, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 13/403,470

(22) Filed: Feb. 23, 2012

(65) Prior Publication Data

US 2013/0226576 A1 Aug. 29, 2013

(51) Int. Cl.
*G10L 15/00* (2013.01)
*G10L 15/04* (2013.01)
*G10L 13/00* (2006.01)

(52) U.S. Cl.
USPC ............................ 704/254; 704/251; 704/258

(58) Field of Classification Search
USPC ................................................. 704/231–277
See application file for complete search history.

(56) References Cited

U.S. PATENT DOCUMENTS 7,487,096 B1 2/2009 Cox et al.
7,593,849 B2 9/2009 Das et al.
7,640,159 B2 12/2009 Reich
7,676,372 B1 * 3/2010 Oba .............................. 704/271
7,830,408 B2 11/2010 Asthana et al.
7,966,188 B2 * 6/2011 Ativanichayaphong et al. ............................ 704/275
8,000,969 B2 8/2011 Da Palma et al.
8,451,823 B2 * 5/2013 Ben-David et al. ........... 370/352
8,566,088 B2 * 10/2013 Pinson et al. ................. 704/235
2002/0049588 A1 * 4/2002 Bennett et al. ................ 704/235
2002/0161882 A1 10/2002 Chatani
2003/0018473 A1 1/2003 Ohnishi et al.
2004/0059580 A1 * 3/2004 Michelson et al. ........ 704/270.1
2007/0038455 A1 2/2007 Murzina et al.
2009/0274299 A1 * 11/2009 Caskey et al. ................. 380/255
2009/0326939 A1 12/2009 Toner et al.
2010/0082327 A1 4/2010 Rogers et al.

* cited by examiner

*Primary Examiner* — Jesse Pullias
(74) *Attorney, Agent, or Firm* — Whitham, Curtis, Christofferson & Cook, P.C.; John R. Pivnichny

(57) ABSTRACT

Speech recognition processing captures phonemes of words in a spoken speech string and retrieves text of words corresponding to particular combinations of phonemes from a phoneme dictionary. A text-to-speech synthesizer then can produce and substitute a synthesized pronunciation of that word in the speech string. If the speech recognition processing fails to recognize a particular combination of phonemes of a word, as spoken, as may occur when a word is spoken with an accent or when the speaker has a speech impediment, the speaker is prompted to clarify the word by entry, as text, from a keyboard or the like for storage in the phoneme dictionary such that a synthesized pronunciation of the word can be played out when the initially unrecognized spoken word is again encountered in a speech string to improve intelligibility, particularly for conference calls.

16 Claims, 2 Drawing Sheets

CONFERENCE CALL SERVICE WITH SPEECH PROCESSING FOR HEAVILY ACCENTED SPEAKERS

FIELD OF THE INVENTION

The present invention generally relates to conference call services and arrangements and, more particularly, to conference call services providing alternative communication facilities for improving understanding of spoken language by participants having heavily accented speech.

BACKGROUND OF THE INVENTION

The currently widespread availability of conference call services has provided a highly convenient alternative to face-to-face meetings for many business, educational and other purposes. Scheduling of such meetings can often be performed automatically through commonly available calendar applications for computers and work stations while additional time for travel to a meeting location can be avoided entirely or reduced to travel to locally available facilities. In this latter regard, it is speculated that cost savings provided by conference call services are increasing at a substantial rate as persons that may be involved in a given aspect of an enterprise and may need to hold such conferences (often referred to as teleconferences) become more geographically diverse and scattered throughout the world. By the same token, the likelihood that a given participant in a given teleconference may speak with an accent that diminishes the likelihood of being correctly understood is greatly increased and hinders the effectiveness of the teleconference while presenting the possibility of generating incorrect or inconsistent information among teleconference participants.

While additional facilities for teleconferences such as visual aids in the form of drawings or slides and video capabilities are known and technically feasible where the conference is performed through networked computers or terminals, such capabilities may or may not be immediately available to all participants who may find it preferable or sometimes necessary to participate through wired or wireless telephone links that may or may not have display or non-voice interface capabilities. That is, while provision of graphic information and/or the image of a speaker during a teleconference may increase the likelihood of the speaker being correctly understood, such facilities may not be available to all participants and, in any event, do not fully answer the problem of a speaker being correctly understood by all teleconference participants, especially when a participant may speak with a particularly heavy accent.

More generally, incorporating the medium of speech into input and output devices for various devices including data processing systems has proven problematic for many years although many sophisticated approaches have been attempted with greater or lesser degrees of success, largely due to difficulties in accommodating heavily accented speech. Speech synthesizers, at the current state of the art, are widely used as output interfaces and, in many applications, are quite successful, although vocabulary is often quite limited and emulation of accents, while currently possible, are not normally provided. The more sophisticated types of speech synthesizers having relatively comprehensive vocabularies are referred to as text-to-speech (TTS) devices.

Developing speech responsiveness for use as an input interface, however, has proven substantially more difficult, particularly in regard to accommodating accents. Simple devices that must distinguish only a small number of commands and input information often require a given speaker to pronounce each of the words that is to be recognized so that a command or information can be matched against a recorded version of the pronunciation. More sophisticated voice recognition systems take a similar approach but at the level of personalized phonemes (e.g. phonemes as spoken by a given individual) which can then be stitched together to reconstruct words that can be recognized. As can be readily understood, such systems are highly processing intensive if they must be able to recognize and differentiate a large vocabulary of words. Error rate reduction is extremely difficult in such systems due to variations in the sound of phonemes when pronounced together with other phonemes. Teleconferences present a particularly difficult application for either of these types of systems since speakers that are widely distributed geographically or may have different cultural backgrounds and/or primary languages will generally represent a wide variety of accents while a large and esoteric vocabulary is likely to be used.

SUMMARY OF THE INVENTION

It is therefore an object of the present invention to provide a system and methodology that can be implemented using commonly available devices, including wired or wireless voice communication devices to increase the ability of a speaker to be accurately understood with minimal intrusion on the conducting of a teleconference in a simple manner.

In order to accomplish these and other objects of the invention, a method of voice communication including voice recognition processing is provided comprising steps of capturing and identifying phonemes of individual words of a spoken speech string comprising spoken words, accessing text corresponding to a combination of phonemes identified in a spoken word of the speech string, synthesizing a pronunciation of that word to provide a synthesized pronunciation, and substituting the synthesized pronunciation for that spoken word in the speech string.

In accordance with another aspect of the invention, a method of providing a conference call service is provided comprising steps of providing a phoneme dictionary storing text of words corresponding to combinations of spoken phonemes during a conference call, accessing text corresponding to a combination of phonemes in a spoken word of a speech string, synthesizing a pronunciation of that word to provide a synthesized pronunciation, and substituting that synthesized pronunciation for the spoken word in the speech string.

In accordance with a further aspect of the invention, a data processing apparatus is provided which is configured to provide recognition of combinations of phonemes comprising words of a spoken speech string, memory comprising a phoneme dictionary containing text of words corresponding to respective combinations of phonemes, and a text-to-speech synthesizer for synthesizing words corresponding to respective combinations of phonemes.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
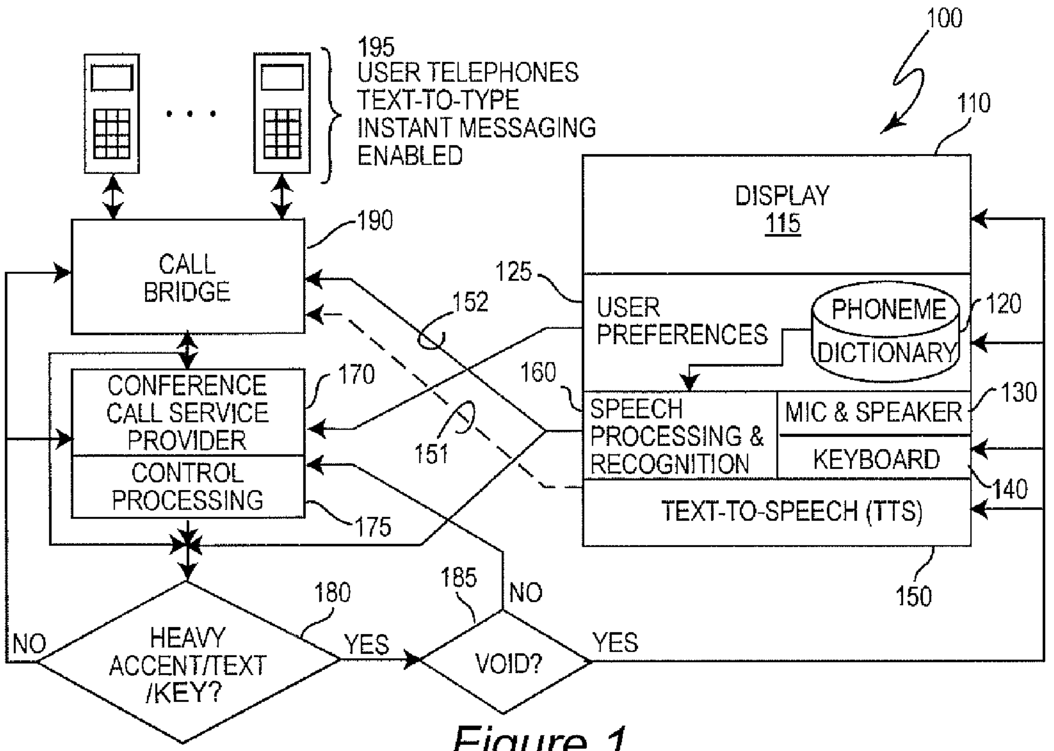
FIG. 1 is a high level block diagram of a preferred exemplary architecture for inclusion of speech processing in a conference call arrangement which can also be understood as a preferred data flow diagram.
Figure 1A:
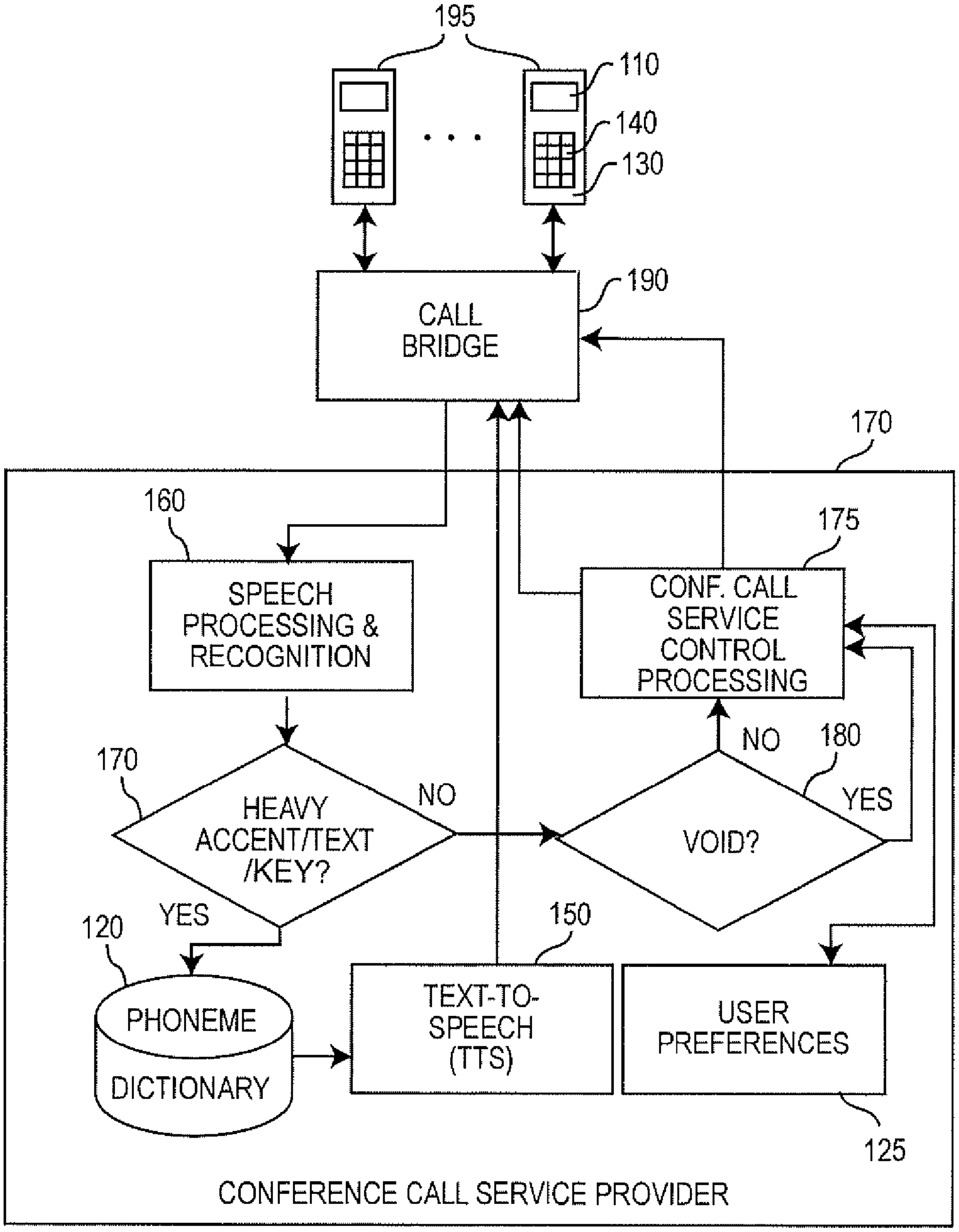
FIG. 1A is a high level block diagram of a variant embodiment of the invention in which speech processing functions are provided centrally by the conference call service provider.

Referring now to the drawings, and more particularly to FIGS. 1 and/or 1A, there is shown a high-level block diagram of a suitable architecture for a preferred embodiment of the invention 100 that will support development of the useful functions the invention can provide. At the level of abstraction illustrated, FIGS. 1 and 1A can also be understood as data flow diagrams. It is to be understood that while the elements necessary for the successful practice of the invention are illustrated, their juxtaposition in FIG. 1 or 1A and the data paths between them can be articulated in several different manners (of which FIGS. 1 and 1A should be understood to be exemplary while including the same elements although in different arrangements) that may provide different advantages in different applications of the invention. As illustrated in FIG. 1, it is only required that the conference call to communicate over the Internet or some other digital network with a single instance of a computer terminal 110 having the capability of providing a phoneme dictionary 120 and speech processing capabilities 160 (as would generally be the case for a person having a heavy accent that frequently used voice processing) while all participants can obtain the advantages of the functionalities of the invention and participate in the conference call through common, commercially available wired or wireless telephone sets. As illustrated in FIG. 1A, phoneme dictionary 120 and speech processing 160 are provided centrally such as in the conference call service provider facility 170, in which case it is immaterial whether conference call participants communicate with conventional telephone sets, computers or terminals although devices having digital communication and/or voice over Internet protocol (VoIP) capabilities are preferred. It may be more convenient in some circumstances for any participant who is aware of having a heavy accent or difficulty in having certain words understood to participate in the conference call through a computer terminal using voice over Internet protocol (VoIP), in which case, terminal 110 would be duplicated for each such participant. Thus, it should be understood that user telephones 195 depicted in FIGS. 1 and 1A may represent either a terminal 110, a wired or wireless telephone set 195 or any other device capable of participating in a conventional telephone call. In other applications where numerous different groups will communicate using a variety of communication devices, it may be preferable to provide terminal 110 or at least some of the capabilities and processing thereof as part of the conference call service provider as illustrated in FIG. 1A. It should also be understood that the embodiments of FIGS. 1 and 1A can be combined to provide speech processing both centrally and locally to some or all conference call participants.

In this regard, it is deemed preferable, for numerous reasons, to provide speech recognition and processing and a phoneme dictionary in the terminal 110 that will be used by one or more heavily accented speakers. Specifically, the appropriate speech processing algorithms for particular languages can be easily set up during a log-on procedure as user preferences 125 for any of a plurality of potential users of the terminal. Such algorithms and, possibly, a partially or fully developed phoneme dictionary for one or more particular accents can be downloaded from a central facility or server which could include the conference call service provider or developed entirely or in part by the user(s). However, personalization of the phoneme dictionary, whether or not starting from an existing phoneme dictionary, can provide a much higher acuity in recognizing and distinguishing between words spoken with an accent. Moreover, since the invention registers words which are not recognized, such that a synthesized word can be substituted in a speech string when a previously unrecognized and clarified word is encountered, a personalized phoneme dictionary for a single or small group of users is likely to be relatively small and certainly much smaller than a generalized and comprehensive phoneme dictionary for a particular accent or plurality of accents, response speed of the speech processing arrangement can be much more rapid with less available processing power. Further, providing speech processing and a phoneme dictionary in a user terminal rather than only as part of conference call service provider processing 175 supports use of the invention in communications other than conference calls such as ordinary telephone communications between two parties.

The basic purpose of the invention is to combine speech processing with text-to-speech (TTS) synthesis capabilities such that words not recognized by the speech processing (e.g. due to a heavy accent, speech impediment or the like, collectively referred to hereinafter as “accent”) can be unambiguously defined by the user, using text input from a keyboard, such that they will be recognized when spoken again and allowing those words to be communicated either as text, synthesized speech generated by TTS processing (e.g. to form an understandable pronunciation of the word) or both.

TTS processing has reached a level of sophistication that speech can be synthesized from text using any desired voice including that of a speaker having a heavy accent. Thus, when the accent of a speaker compromises the understanding of a pronounced word, the word can be recognized and rendered as unambiguous text and a more recognizable pronunciation of the word synthesized from the text. The speaker’s actual speech and synthesized speech can be integrated together in a single speech string on a word-by-word basis to allow the speaker to be more reliably understood, regardless of how heavily accented the speaker’s actual speech may be. The invention thus allows the speaker to be clearly understood, usually without interrupting the speaker for clarification of words that might not be initially understood and largely avoids misunderstanding of communicated information. However, the invention also can interrupt the speaker or allow the speaker to be interrupted in real time during a call or conference call for clarification of any word not understood by either the speech processing arrangement or by any participant in a call or conference call. Such clarification will avoid a need for subsequent interruption for any word that has been previously clarified. That is, the vocabulary of words to be synthesized can be built up adaptively during use during ordinary telephone calls, conference calls or through operation of the invention by the user alone in advance of either type of communication.

To provide such a function, user terminal 110, when used for a heavily accented speaker to participate in a conference call, as is preferred, preferably includes a display 115, a memory 125 for storing user preferences including a personalized phoneme dictionary 120, a microphone and speaker 130, a keyboard 140, a text to speech unit (which may be embodied in software, hardware or a combination thereof) 150, and a speech processing and recognition unit 160 (which may also be embodied in software, hardware or a combination thereof). This configuration has the advantage of allowing the user to develop an individual phoneme dictionary for personalized accent and speech patterns and to do so independently of a conference call. That is, a person knowing of words that are sometimes misunderstood can essentially register those words in advance of a conference call or other verbal communication to avoid interruption of the communication of information when such words are used but not recognized, particularly during early stages of use of the invention when entries in the phoneme dictionary 120 may not be extensive. This capability is considered very desirable, particularly in the context of a conference call since an interruption and clarification consumes the time of all participants and, particularly where participants may represent numerous cultures and primary languages, a given word may be understood by some participants while not understood by others. This important capability would not be available in an embodiment where the speech recognition and processing 160 and phoneme dictionary 120 were provided only as part of the conference call service provider 170 processing as in the embodiment illustrated in FIG. 1A which includes the same functional elements as FIG. 1 but provides the advantage of allowing any device suitable for a communication by telephone to be used by any participant for a conference call. Also, in the embodiment of FIG. 1A, the capability for registering particular words by a user in advance of a conference call can also be provided, if desired. It should also be understood that such embodiments as are shown in FIGS. 1 and 1A are not mutually exclusive and the conference call service provider 170 and an arbitrary number of terminals 110 which also include a phoneme dictionary 120 and speech recognition and processing 160 can be used together in other embodiments of the invention.

Figure 2:
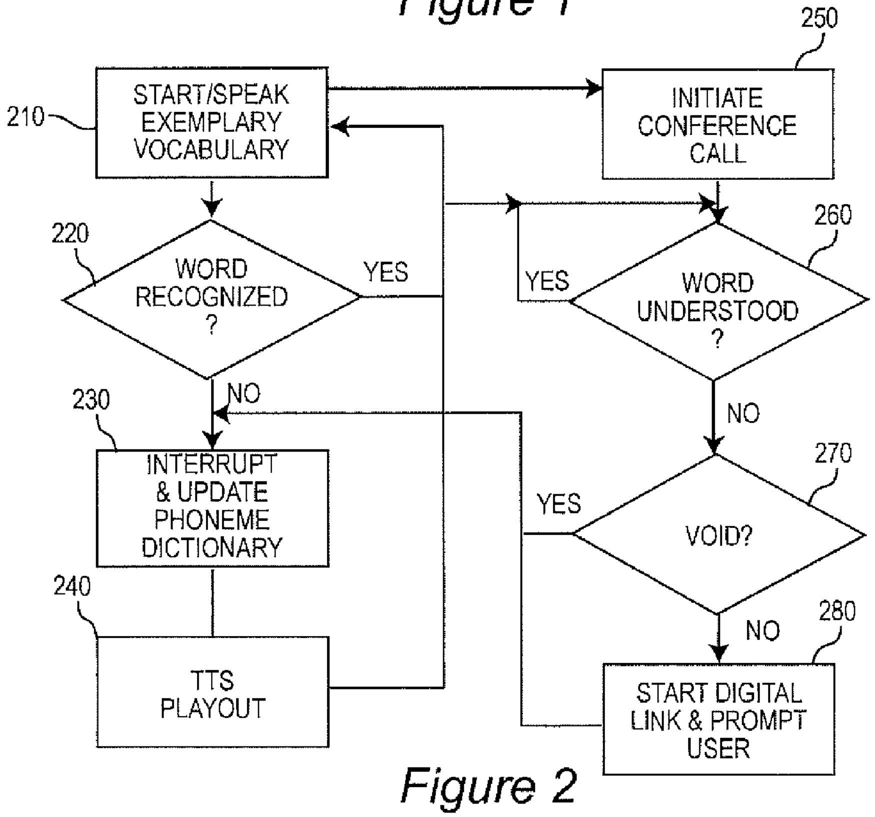
FIG. 2 is a flow chart of an exemplary methodology in accordance with the invention.

Referring now to FIG. 2, as is known in the art, a phoneme dictionary may be developed in numerous ways, depending on the processing and intended capabilities provided by a given phoneme dictionary implementation. In general, if the phoneme dictionary is to be specific to a given user, the user would be initially prompted to pronounce a number of relatively common words or numbers (e.g. commands for a simple voice control system) and the pronunciation captured and analyzed into data suitable for digital storage. For practice of the invention, it is deemed preferable to extract individual phonemes that comprise the words and which correspond to different combinations of letters. As illustrated at 210 of FIG. 2, the words initially captured are preferably chosen to provide a set of phonemes which will be substantially exhaustive of the phonemes that will occur in the speech of the user. If the phonemes captured correspond to a given word in the language in use, the word is deemed to be recognized and sufficiently represented in the phoneme dictionary such that the next word of a speech string (e.g. sentence) can be processed. If, on the other hand, the word is not recognized (e.g. the word the user is prompted to pronounce), the phonemes as spoken by the user are captured and the user is prompted to clarify the word by supplying the word as text such as by typing the word from a keyboard, selection from a menu of similar sounding words, speech recognition of spoken individual letters of the word or the like. (Many commercially available telephone sets provide recognition of individual letters of many words even when entered from a ten or twelve key keyboard.) The captured phonemes and the corresponding word, as text, can then be correlated with the expected or normal phonemes for the word to update the phoneme dictionary. The phoneme dictionary and speech processing can thus supply a "translation" of a word as spoken with a heavy accent to a pronunciation that can be more readily understood, even when using phonemes as spoken by a given speaker and rendering the word in the speaker's voice.

Once such a set of phonemes is captured and correlated with particular character combinations or symbols in a given language and the phoneme normally associated with the characters or symbols, the phoneme dictionary should be capable of recognizing other words from combinations of phonemes and checking such words against a digital dictionary operated much in the manner of spelling check software of a word processor. At this point in the development of a phoneme dictionary, there will still be instances where words spoken by a user will not be recognized although the majority of words are likely to be recognized by the speech recognition processing 160 and the phoneme dictionary will have been developed to the point where the invention can be used to advantage in a conference call. Therefore, but for the possibility of infrequent interruptions of a speaker when a word cannot be recognized, it is immaterial whether further development of the phoneme directory is achieved in real time during a conference call or by user operation simply by speaking words known to be occasionally misunderstood or likely to be used in a conference call to be captured and clarified if not recognized.

In either case, when a word is spoken that is not recognized by speech recognition processing 160, the user is prompted to supply the word as text, such as by entry from a keyboard, selection from a menu, voice recognition of the individual characters or the like, and such information is stored with the captured word in the phoneme dictionary, as illustrated at 230 of FIG. 2. Then, the word may be optionally synthesized from the text by TTS 150, as shown at 240 of FIG. 2 and played out for confirmation of the phoneme dictionary update. Once the update has been confirmed as correct, speech input can be resumed. Thereafter, during a conference call or regular telephone communication, if a previously unrecognized word is uttered by the user, it will be recognized as such by speech processing 160, the captured phonemes used to access the phoneme dictionary 120 and the TTS-synthesized pronunciation of the word substituted for the previously unrecognized word in the speech string communicated to the call participants as shown by dashed line 151 in FIG. 1. However, it should be understood that it is preferred for the synthesized word to be communicated to the speech processing arrangement 160 where it can be substituted for the word currently being processed and communicated to the call bridge 190 over connection 152 in the normal course of the conference call and without requiring any modification or special processing from the conference call service provider 170. This is the normal mode of operation for use of the invention during a conference call or other telephonic communication. However, if a word is unrecognized during the course of a conference call, the phoneme dictionary can be updated in much the same manner as will now be explained.

It should be appreciated that the perception of an accent can originate in several ways. For example, an accent can be acquired by a speaker from regional and/or cultural influences or in use of a language that is not the primary language of the speaker. On the other hand, an accent may be perceived by a listener due to similar regional or cultural differences between the speaker and listener or due to the listener having a different primary language from that of the speaker. For example, a listener having one of several Eastern languages as a primary language may by confused by the greater number of pronunciations of consonants and greater variation in the pronunciation of vowels in many western languages (where substantially less information is conveyed by vowels than is conveyed by consonants).

Referring again to FIG. 2, once a conference call or other telephonic communication has been initiated, as illustrated at 250 of FIG. 2, the speech recognition processing 160 will monitor the speech being communicated. Words initially unrecognized and entered in the phoneme dictionary will be recognized as such and TTS synthesizer pronunciation of the word substituted automatically in the speech string as distributed to the user terminals or telephone sets 195 of conference call participants through the conference call service provider 170 and call bridge 190. If the link (e.g. conference call leg) for a given call participant is capable of digital transmission such as by use of voice over internet protocol (VoIP), the text of the initially unrecognized and clarified words can be transmitted and displayed in the manner of instant messaging, if desired.

In this regard, at the present state of the art and for the foreseeable future, it can be assumed that a human listener will be more able to recognize particular words than computerized speech recognition arrangements. Therefore, any word likely to be misunderstood by a human listener is even more likely to be detected as unrecognized by a speech recognition arrangement and the phoneme dictionary updated either previously or in real time during a conference or regular call. Nevertheless, as a perfecting feature of the invention not necessary to its successful practice in accordance with its basic principles, it is preferred to provide for signaling from user terminals or telephone sets 195 (e.g. by pressing a key) that is monitored as illustrated at 260 of FIG. 2 and will initiate further updating of the phoneme dictionary as described above when any given word is not understood by any participant in the conference call.

If a word is not recognized (or understood) during the course of a conference or regular call, or if digital text is present, as detected at 180 of FIG. 1, each leg of a conference or regular call is checked to determine if VoIP or other digital communication has been or can be established and a digital transmission link established by conference call control processing 175 if needed or desired as depicted at 185 of FIGS. 1 and 270 of FIG. 2. This facility also allows any participant to automatically establish a digital communication link, if available, as depicted at 280 of FIG. 2 and to receive text corresponding to any word of questionable pronunciation such that the text can be displayed much in the manner of a sub-title.

In response to either signaling from participant terminals or telephone sets or detection of an unrecognized word during a conference call or other telephone communication, a prompt is sent to the speaker to enter the unrecognized word as text, as discussed above. If the text of the word is then entered by the speaker, the phoneme dictionary is updated as discussed above and a TTS-synthesized pronunciation played out and delivered to all participants, as depicted at 240 of FIG. 2. Thereafter, upon recurrence of the word in speech of a speaker, the TTS-synthesized pronunciation will be automatically substituted for the spoken word in the speech sent to call participants and, if possible using available communication links, text of the word will be transmitted and can be displayed to the conference call participant, as well.

In view of the foregoing, it is seen that the invention provides a substantial improvement of intelligibility of speech during telephonic communications such as a conference call with minimal intrusion or interruption of the information being conveyed. For speakers having a heavy accent, speech impediment or the like, a TTS synthesizer pronunciation of any word as well as a corresponding text version of the word can be send to minimize any possibility of the word being misunderstood by a listener. The fact that speech recognition processing is less able to understand a given word, particularly if an accent or speech impediment is present, not only allows the adaptive development of phoneme dictionaries that may advantageously be personalized but is leveraged by the invention to assure that any word likely to be misunderstood by a human listener will generally be available and can be communicated not only with improved synthesized pronunciation and with redundant corresponding text and any word not apparently available can be added to the phoneme dictionary or dictionaries automatically and with minimal intrusion on the telephonic communication.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of voice communication including voice recognition processing, said method comprising steps of capturing and identifying phonemes of individual words of a spoken speech string comprising spoken words, initiating a conference call, interrupting said conference call when a word of said speech string is not recognized, accessing text corresponding to a combination of phonemes identified in a spoken word of said speech string, synthesizing a pronunciation of said word of said speech string to provide a synthesized pronunciation, and substituting said synthesized pronunciation for said spoken word in said speech string.

2. The method as recited in claim 1, wherein said synthesized pronunciation is synthesized from said text.

3. The method as recited in claim 2, including a further step of displaying said text to a receiver of said voice communication.

4. The method as recited in claim 1, including a further step of displaying said text to a receiver of said voice communication.

5. The method a recited in claim 1, including further steps of prompting a speaker of said speech string to enter a word of said speech string as text, and storing said text of said word of said speech string to be accessed in accordance with said combination of phonemes.

6. The method as recited in claim 5, wherein said text of said word of said speech string is entered from a keyboard.

7. A method of providing a conference call service, said method comprising steps of providing a phoneme dictionary storing text of words corresponding to combinations of spoken phonemes during a conference call, initiating a conference call, interrupting said conference call when a word of said speech string is not recognized, accessing text corresponding to a combination of phonemes in a spoken word of said speech string, synthesizing a pronunciation of said word of said speech string to provide a synthesized pronunciation, and substituting said synthesized pronunciation for said spoken word in said speech string.

8. The method as recited in claim 7, including the further step of providing said text corresponding to a spoken word to participants in said conference call.

9. The method as recited in claim 8, including the further step of prompting a speaker of said speech string to enter text of a word of said speech string.

10. The method as recited in claim 9, wherein said text is entered from a keyboard in response to said prompt.

11. The method as recited in claim 9, wherein said prompting step is performed responsive to a participant in said conference call.

12. Data processing apparatus configured to provide a connection to a communication system capable of conducting a conference call, recognition of combinations of phonemes comprising words of a spoken speech string, interruption of said conference call when a word of said speech string is not recognized, memory comprising a phoneme dictionary containing text of words corresponding to respective ones of said combinations of phonemes, and a text-to-speech synthesizer for synthesizing words corresponding to said combinations of phonemes.

13. Data processing apparatus as recited in claim 12, further comprising a display for prompting a speaker to provide text corresponding to a word of said speech string for storage in said memory with a combination of phonemes comprising said word of said speech string.

14. Data processing apparatus as recited in claim 13, further comprising a communication arrangement to transmit said speech string having a word synthesized by said text-to-speech synthesizer substituted for a word of said speech string as spoken by a speaker.

15. Data processing apparatus as recited in claim 14 wherein said communication arrangement also transmits said text of said word substituted in said speech string.

16. Data processing apparatus as recited in claim 13, further comprising conference call control processing.

* * * * *